(12) United States Patent
Wendt et al.

(10) Patent No.: US 10,110,387 B2
(45) Date of Patent: Oct. 23, 2018

(54) POWERED DEVICE AND POWER DISTRIBUTION SYSTEM COMPRISING THE POWERED DEVICE

(71) Applicant: PHILIPS LIGHTING HOLDING B.V., Eindhoven (NL)

(72) Inventors: Matthias Wendt, Würselen (DE); Lennart Yseboodt, Retie (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 256 days.

(21) Appl. No.: 14/899,182

(22) PCT Filed: Jun. 17, 2014

(86) PCT No.: PCT/EP2014/062616
§ 371 (c)(1),
(2) Date: Dec. 17, 2015

(87) PCT Pub. No.: WO2014/206797
PCT Pub. Date: Dec. 31, 2014

(65) Prior Publication Data
US 2016/0149713 A1    May 26, 2016

(30) Foreign Application Priority Data
Jun. 27, 2013   (EP) .................................. 13174008

(51) Int. Cl.
*H04L 12/10*      (2006.01)
*H05B 33/02*      (2006.01)
(Continued)

(52) U.S. Cl.
CPC ........ *H04L 12/10* (2013.01); *H04L 12/40045* (2013.01); *H05B 33/0842* (2013.01); *H05B 37/0254* (2013.01)

(58) Field of Classification Search
CPC ... H04L 12/10; H04L 12/40045; H04L 12/40; G06F 1/266; G06F 1/3206; H05B 33/0815; H05B 33/0842; H05B 37/0254
See application file for complete search history.

(56) References Cited

U.S. PATENT DOCUMENTS 5,404,090 A    4/1995    Shinbori
5,844,327 A    12/1998   Batson
(Continued)

FOREIGN PATENT DOCUMENTS

CN    102830303 A    12/2012
JP    2003068480 A    3/2003
(Continued)

*Primary Examiner* — Ryan Johnson
(74) *Attorney, Agent, or Firm* — Meenakshy Chakravorty (57) ABSTRACT

The invention relates to a powered device (2) like a luminaire for being used in a power distribution system (100), which is preferentially a PoE system and which comprises a power supply device (1). The powered device includes an electrical load like a light source, a voltage measurement unit for measuring a voltage received by the powered device, and an electrical load power providing unit for transforming power supplied by the power supply device to an electrical load power to be provided to the electrical load, wherein the power level of the electrical load power depends on the measured voltage. This allows adapting the power intake to the really received voltage, which may be reduced due to losses like cable losses, which in turn can lead to an increased intake power in comparison to the intake power of powered devices in accordance with the actual Po E IEEE 802.3at standard.

15 Claims, 4 Drawing Sheets

(51) Int. Cl.
*H04L 12/40* (2006.01)
*H05B 37/02* (2006.01)
*H05B 33/08* (2006.01)

(56) References Cited

U.S. PATENT DOCUMENTS

| | | | |
|---|---|---|---|
| 7,154,381 B2 * | 12/2006 | Lang | G06F 1/266 |
| | | | 340/12.32 |
| 9,488,997 B1 * | 11/2016 | Dwelley | G05F 1/462 |
| 2005/0122140 A1 | 6/2005 | Peker et al. | |
| 2008/0276104 A1 | 11/2008 | Hussain et al. | |
| 2009/0033345 A1 | 2/2009 | Picard et al. | |
| 2010/0077239 A1 | 3/2010 | Diab et al. | |
| 2015/0122140 A1 | 5/2015 | Yuno | |

FOREIGN PATENT DOCUMENTS

| | | |
|---|---|---|
| JP | 2012231440 A | 11/2012 |
| JP | 2013093323 A | 5/2013 |
| JP | 2016506708 A | 3/2016 |
| WO | 2013038339 A1 | 3/2013 |
| WO | 2013050970 A1 | 4/2013 |

* cited by examiner

POWERED DEVICE AND POWER DISTRIBUTION SYSTEM COMPRISING THE POWERED DEVICE

CROSS-REFERENCE TO PRIOR APPLICATIONS

This application is the U.S. National Phase application under 35 U.S.C. § 371 of International Application No. PCT/EP2014/062616, filed on Jun. 17, 2014, which claims the benefit of European Patent Application No. 13174008.6, filed on Jun. 27, 2013. These applications are hereby incorporated by reference herein.

FIELD OF THE INVENTION

The invention relates to a power distribution system comprising a power supply device for supplying power, a powered device for receiving the supplied power and an electrical conductor connected to the power supply device and the powered device for transmitting the power and data between the power supply device and the powered device. The invention relates further to a powered device for being used in the power distribution system and comprising an electrical load and an electrical load power providing unit for providing electrical load power to the electrical load, and a method and computer program for providing the electrical load power to the electrical load of the powered device.

BACKGROUND OF THE INVENTION

In Power-over-Ethernet (PoE) systems in accordance with the PoE standard IEEE 802.3at a power supply equipment (PSE) device powers one or several powered devices via one or several Ethernet cables. The PSE device is, for instance, a switch and the powered devices are, for example, internet protocol (IP) cameras, IP phones, wireless access points, luminaires, sensors, fans, et cetera. In accordance with the standard, the power intake of the powered devices is limited to a relatively small power level only, which is smaller than the power level suppliable by each port of the PSE device, in order to compensate for possible losses in the Ethernet cables.

SUMMARY OF THE INVENTION

It is an object of the present invention to provide a powered device for being used in a power distribution system like a PoE system, which can have a larger power intake. It is a further object of the present invention to provide a power distribution system with the powered device, and a method and computer program for providing electrical load power to an electrical load of the powered device.

In a first aspect of the present invention a powered device for being used in a power distribution system is presented, wherein the system comprises a power supply device for supplying power to the powered device and an electrical conductor connected to the power supply device and the powered device for transmitting the power and data between the power supply device and the powered device, wherein the powered device comprises:
an electrical load,
a voltage measurement unit for measuring a voltage received by the powered device, and
an electrical load power providing unit for transforming the supplied power into an electrical load power and for providing the electrical load power to the electrical load, wherein the electrical load power providing unit is adapted such that the power level of the electrical load power depends on the measured voltage.

Since the powered device comprises a voltage measurement unit for measuring a voltage received by the powered device, wherein the power level of the electrical load power provided by the electrical load power providing unit to the electrical load of the powered device depends on the measured voltage, the electrical load power and, thus, the power intake of the powered device can be adapted to the voltage, which is really received by the powered device and which may be reduced due to losses like cable losses. This allows for an increase of the intake power of the powered device, if the voltage received by the powered device is sufficiently high.

The power distribution system is preferentially a PoE system, wherein the power supply device and the powered device are PoE devices and the electrical conductor is an Ethernet cable. The power supply device, which can also be regarded as being a PSE device, may be an endspan device like a switch or a midspan device like a PoE injector. The electrical load may be a light source like a light emitting diode (LED), a sensor, a fan, et cetera.

The electrical load power providing unit is adapted such that the power level of the electrical load power depends linearly on the measured voltage. In particular, the electrical load power providing unit may be adapted such that the power level of the electrical load power depends linearly on the measured voltage, if the measured voltage is smaller than a first threshold and larger than a second threshold. The electrical load power providing unit may be adapted such that, if the measured voltage is larger than a first threshold, the power level has a first constant value. Moreover, the electrical load power providing unit may further be adapted such that, if the measured voltage is below a second threshold, the power level has a second constant value. The second threshold may be a smaller threshold of about 40 V, particularly 42.5 V, and the first threshold may be a larger threshold of about 57 V, particularly 57.0 V. The second constant value of the power level may be about 25 W, particularly 25.5 W, and the first constant value of the power level may be about 34 W, particularly 34.2 W. The linear dependence allows for a linear adaptation of the intake power of the powered device to the current measured voltage, i.e. to the respective losses. Moreover, the first constant value ensures that the maximum power intake of the powered device is not larger than a predefined maximum power, thereby reducing the likelihood of overload conditions.

In an embodiment the electrical load power providing unit is adapted such that the power level of the electrical load power depends linearly on the measured voltage with a first slope within a first range of measured voltages and that the power level of the electrical load power depends linearly on the measured voltage with a second slope within a second range of measured voltages. For instance, the first slope may be used during power-up, until a minimum power level, in particular, the above mentioned second constant value of the power level, is reached, and the second slope can be used between, for instance, the above mentioned first threshold of the measured voltage and the above mentioned second threshold of the measured voltage, in order to linearly adapt the intake power of the powered device to the actually measured voltage. Thus, the first range of measured voltages may include voltages being smaller than the second threshold and the second range of measured voltages may include voltages between the first and second thresholds.

The voltage measurement unit may be adapted to provide a measurement signal being indicative of the measured voltage, wherein the electrical load power providing unit may be adapted to low pass filter the measurement signal. The measurement signal may be directly low pass filtered, or the measurement signal may indirectly be low pass filtered by low pass filtering a signal like a control signal, which may have been derived from and/or depend on the measurement signal. By low pass filtering possible reactions on noise and interferences may be reduced, thereby improving the control of the generation and provision of the electrical load power.

The powered device may comprise a power-data splitter for splitting the data and the power transmitted by the electrical conductor, wherein the voltage measurement unit may be adapted to measure the voltage behind the power-data splitter. The power-data splitter comprises preferentially a magnetic circuit splitting power and data signals, which may also be regarded as being communication signals. The power-data splitter may be integrated in a jack of the powered device to which the electrical conductor may be connected. Moreover, the powered device may comprise a rectifier for rectifying the split power, wherein the voltage measurement unit may be adapted to measure the voltage behind the rectifier. The powered device preferentially further comprises a powered device controller for identifying the powered device in the system and for negotiating a power class with the power supply device.

In a further preferred embodiment the electrical load power providing unit comprises an electrical load driver for transforming the supplied power into the electrical load power and for providing the electrical load power to the electrical load, and an electrical load power controller for determining the power level of the electrical load power depending on the measured voltage and for sending a power control signal being indicative of the determined power level to the electrical load driver, wherein the electrical load driver is adapted to transform the supplied power into the electrical load power in accordance with the power control signal. The electrical load driver is preferentially adapted to generate the electrical load power by generating a corresponding electrical load driving current for driving the electrical load. The electrical load power providing unit may be adapted to low pass filter the control signal.

In a further aspect of the present invention a power distribution system is presented, wherein the system comprises:

a power supply device for supplying power, a powered device for receiving the supplied power as defined in claim 1, and an electrical conductor connected to the power supply device and the powered device for transmitting the power and data between the power supply device and the powered device.

In another aspect of the present invention a method for providing electrical load power to an electrical load of a powered device as defined in claim 1 within a system as defined in claim 12 is presented, wherein the method comprises:

measuring a voltage received by the powered device by a voltage measurement unit of the powered device, and transforming the supplied power into an electrical load power and providing the electrical load power to the electrical load by an electrical load power providing unit, wherein the power level of the electrical load power depends on the measured voltage.

In a further aspect of the present invention a computer program for providing electrical load power to an electrical load of a powered device as defined in claim 1 within a system as defined in claim 12 is presented, wherein the computer program comprises program code means for causing the powered device to carry out the steps of the method as defined in claim 14, when the computer program is run on a computer controlling the powered device.

It shall be understood that the powered device of claim 1, the power distribution system of claim 12, the method of claim 14, and the computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
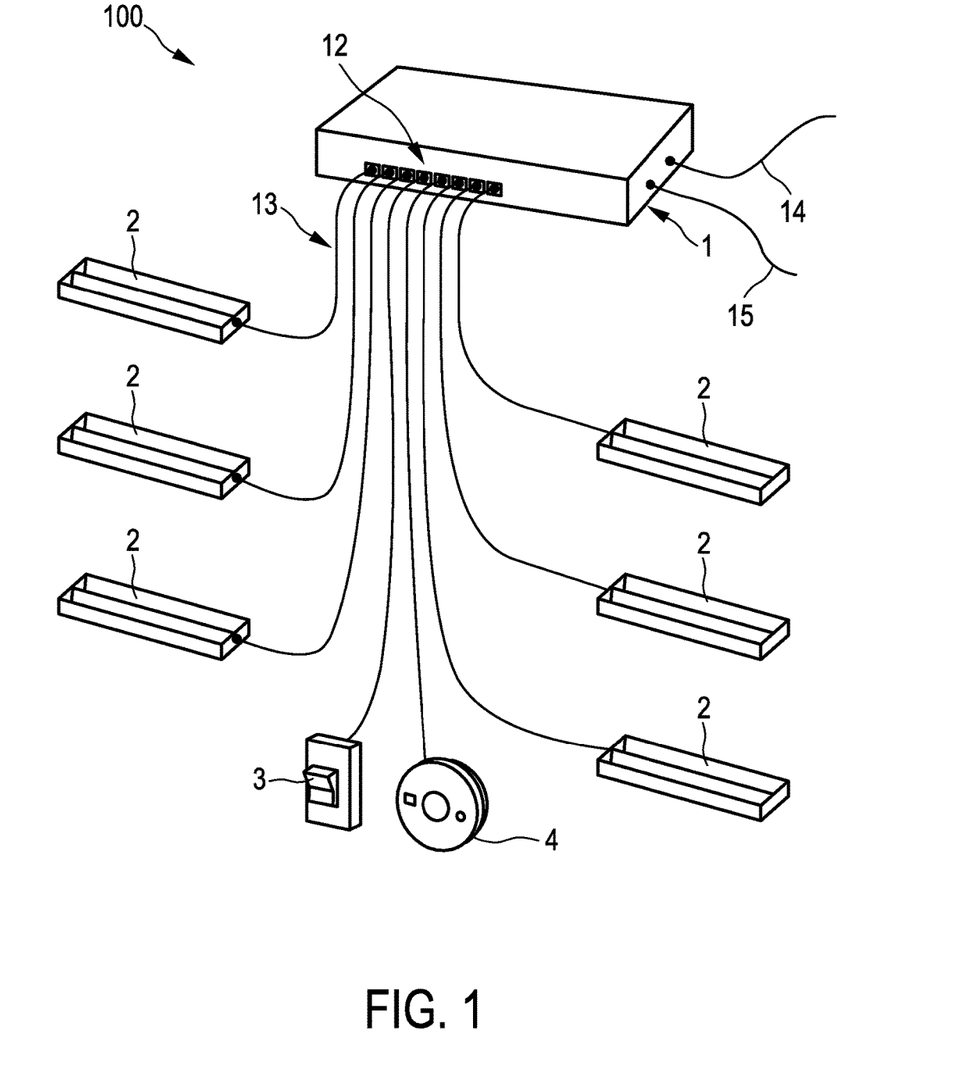
FIG. 1 shows schematically and exemplarily an embodiment of a power distribution system.

FIG. 1 shows schematically and exemplarily a power distribution system 100 comprising a power supply device 1 for supplying power to powered devices 2, 3 and 4. In this embodiment the power distribution system 100 is a PoE system and the power supply device 1 is a switch. The power supply device 1 is schematically and exemplarily shown in more detail in FIG. 2.

Figure 2:
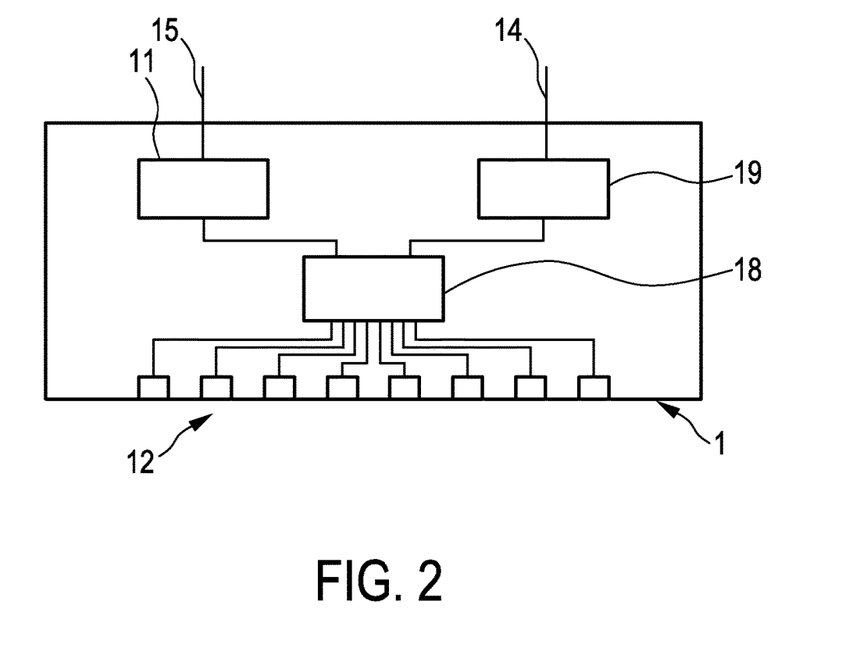
FIG. 2 shows schematically and exemplarily an embodiment of a powered supply device of the system shown in FIG. 1.

The power supply device 1 comprises several ports 12, to which the powered devices 2, 3, and 4 are connected via Ethernet cables 13, which are adapted to transmit power and data. The power supply device 1 receives power via an electrical connection 15 like a power cable from, for instance, a mains power supply or another device. The power is transformed to a power usable by the powered devices 2, 3, 4 by a power supply unit 11, before the transformed power is provided to the powered devices 2, 3, 4 via a power device manager 18. The power supply device 1 further receives data from another device like another switch via an Ethernet cable 14, wherein the data may be processed by a network data processor 19 before being sent to the respective powered device via the power device manager 18.

The powered devices include luminaires 2, a switching element 3 and a presence sensor 4, wherein the luminaires 2, the switching element 3 and the presence sensor 4 can be adapted such that the switching element 3 and/or the sensor 4 send switching and/or dimming commands to the luminaires 2 via the switch 1, after the switching element 3 has been actuated by a person and and/or the presence of a person has been detected by the sensor 4. A luminaire 2 is schematically and exemplarily shown in more detail in FIG. 3.

Figure 3:
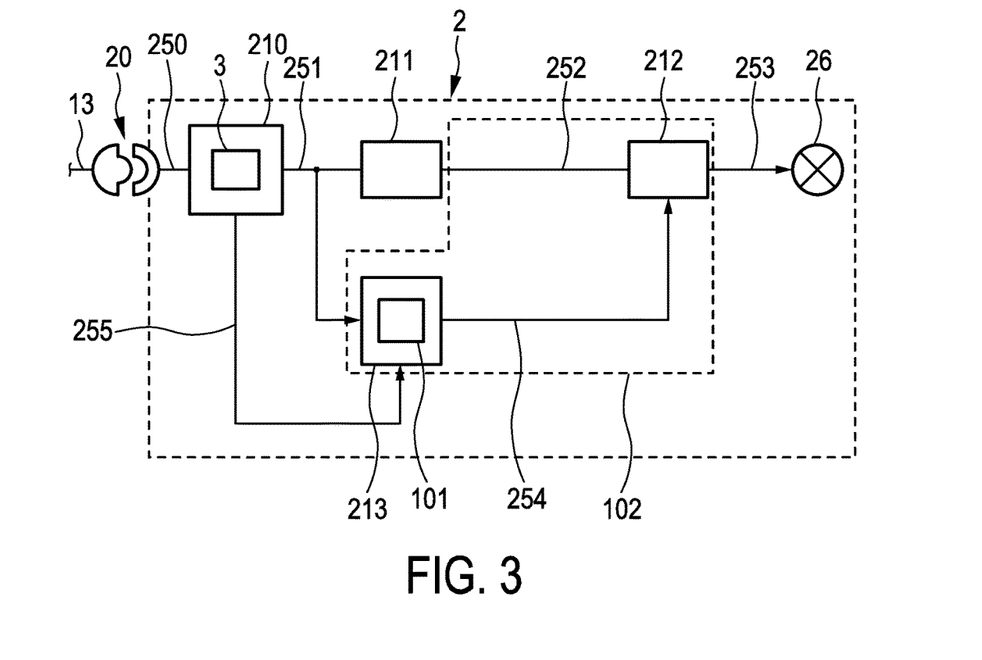
FIG. 3 shows schematically and exemplarily an embodiment of a powered device of the system shown in FIG. 1.

The luminaire 2 comprises an electrical load being, in this embodiment, a light source 26. The luminaire 2 further comprises a voltage measurement unit 101 for measuring a voltage received by the luminaire 2 from the power supply device 1 via the respective Ethernet cable 13 and an electrical load power providing unit 102 for transforming the power supplied by the power supply device 1 into an electrical load power and for providing the electrical load power to the electrical load 26, wherein the electrical load power providing unit 102 is adapted such that the power level of the electrical load power depends on the measured voltage. In this embodiment the electrical load power providing unit 102 is adapted such that the power level P of the electrical power depends linearly on the measured voltage U, if the measured voltage is smaller than a first threshold $U_{UT}$ and larger than a second threshold $U_{LT}$. Moreover, the electrical load power providing unit 102 may be adapted such that, if the measured voltage is larger than the first threshold, the power level has a first constant value $P_{UT}$, and, if the measured voltage is below the second threshold, the power level has a second constant value $P_{LT}$. The linear dependence between the first and second thresholds may be defined by following equation:

$$P=P_{LT}+((P_{UT}-P_{LT})(U-U_{LT})/(U_{UT}-U_{LT})). \quad (1)$$

Figure 4:
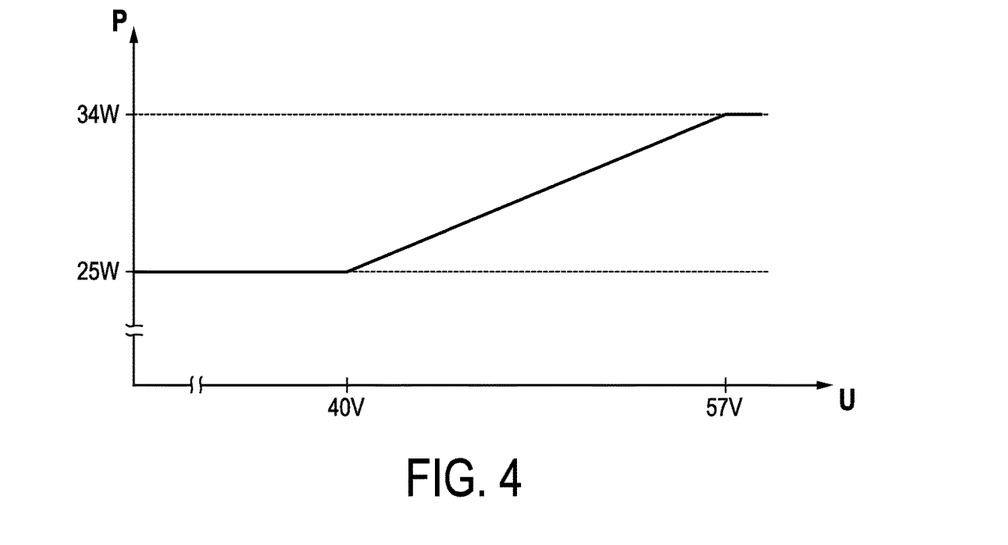
FIG. 4 illustrates a dependence of a power level of an electrical load power of the powered device on a voltage at the powered device.

In this embodiment the first threshold $U_{UT}$ may be about 57 V, the second threshold $U_{LT}$ may be about 40 V, the first constant value $P_{LT}$ may be about 34 W and the second constant value $P_{UT}$ may be about 25 W such that the dependence of the electrical load power on the measured voltage may be as schematically and exemplarily shown in FIG. 4. In other embodiments the first threshold $U_{UT}$ and/or the second threshold $U_{LT}$ and/or the first constant value $P_{LT}$ and/or the second constant value $P_{UT}$ may have another value.

The Ethernet cable 13 is connected with a jack 20 of the luminaire 2, wherein the transmitted power and data are provided to a power-data splitter 210 via a power and data path 250. The power-data splitter 210 splits the data and the power transmitted by the Ethernet cable 13, wherein the voltage measurement unit 101 is adapted to measure the voltage behind the power-data splitter 210. The split data is transmitted further via a data path 255 and the split power is transmitted further via the power path 251. The power-data splitter 210 comprises beneficially a magnetic circuit for splitting the power and data signals. Moreover, the power-data splitter 210 comprises a rectifier 3 for rectifying the split power, wherein the voltage measurement unit 101 is adapted to measure the rectified voltage. In particular, the voltage measurement unit 101 is adapted to measure only positive levels behind the rectifier. Since the voltage is measured behind the power-data splitter 210 comprising the rectifier 3, losses in the power-data splitter 210, particularly in the splitting circuit and the rectifier of the power-data splitter 210, are already taken into account by the voltage measurement.

The luminaire 2 further comprises a powered device controller 211 for identifying the luminaire 2 in the PoE system 100 and for negotiating a power class with the switch 1. The electrical load power providing unit 102 comprises an electrical load driver 212 for transforming the supplied power, which is received by the electrical load driver 212 via the powered device controller 211, into the electrical load power and for providing the electrical load power to the electrical load 26, and an electrical load power controller 213 for determining the power level of the electrical load power depending on the measured voltage and for sending a power control signal being indicative of the determined power level via a control signal path 254 to the electrical load driver 212. The electrical load driver 212 is adapted to transform the supplied power into the electrical load power in accordance with the power control signal received from the electrical load power controller 213. The electrical load power is provided from the electrical load driver 212 to the electrical load 26 via an electrical load power path 253. In this embodiment the voltage measurement unit 101 is integrated in the electrical load power controller 213. However, in another embodiment the voltage measurement unit can also be a separate unit for measuring the voltage and for providing the measured voltage to the electrical load power controller 213. The electrical load driver 212 is adapted to generate the electrical load power by generating a corresponding electrical load driving current for driving the electrical load 26. The electrical load power providing unit 102, in particular, the electrical load power controller 213 or the electrical load driver 212 may be adapted to low pass filter the control signal.

In this embodiment the electrical load power controller 213 also receives control commands via the data path 255, wherein the electrical load power controller 213 is adapted to provide the power level of the electrical load power also depending on the received control commands. For instance, the received control commands can indicate that the luminaire 2 should be switched off or switched on or should be set to a certain dim level. In another embodiment, alternatively or in addition, data, in particular, control commands, provided via the data path 255 can be used by another control unit of the luminaire 2. Moreover, in a further embodiment the dim level of the luminaire may not be determined via control commands, i.e. via Ethernet control commands, but the dim level may be adjusted in an analog fashion by using the control of the power level of the electrical load power depending on the measured voltage. In this case the ratio of the first constant power value $P_{LT}$ to the second constant value $P_{UT}$ may be much smaller than described in the above mentioned embodiments. For instance, the first constant value $P_{LT}$ may be about 5 percent of the second constant value $P_{UT}$.

When the power level of the electrical load power is changed depending on the measured voltage, also the load current will change. This will result in a change of the voltage drop, for example, over the resistance of the cable following Ohm's law, which in turn will modify the voltage measurement and hence will influence the power level of the electrical load power again. If the changes on the power level of the electrical load power are not executed with a slow rate, an oscillation may start. The luminaire 2 is therefore preferentially adapted such that the run-up of the luminaire power is relatively soft. For instance, in an embodiment it preferentially increases from 0 percent to 100 percent in 0.1 s or in a longer time, further preferred in 0.5 s or in a longer time, and even further preferred in 5 s or in a longer time.

Figure 5:
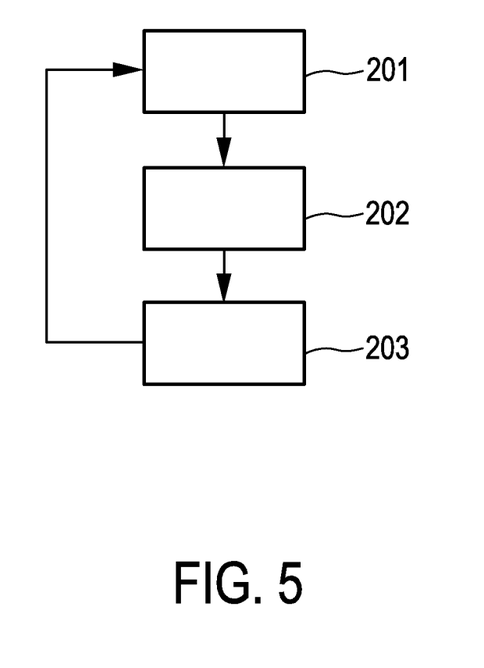
FIG. 5 shows a flowchart exemplarily illustrating an embodiment of a method for providing electrical load power to an electrical load of a powered device within a power distribution system.

In the following an embodiment of a method for providing electrical load power to an electrical load of a powered device within a power distribution system will exemplarily be described with reference to a flowchart shown in FIG. 5.

During supplying power to the powered device 2 by a power supply device 1, in step 201 a voltage received by the powered device 2 is measured by the voltage measurement unit 101 of the powered device 2, wherein in step 202 the supplied power is transformed into an electrical load power by the electrical load power providing unit 102, wherein the power level of the electrical load power depends on the measured voltage. In step 203 the electrical load power providing unit 102 provides the generated electrical load power to the electrical load 26. Steps 201 to 203 may be carried out in a loop, in order to allow the powered device 2 to react on the actually available power.

PoE is a standard to supply detached powered devices through the same wire with power and data. The powered devices may be IP cameras, IP phones, wireless access points, lighting equipment like sensors, switching elements, luminaires, et cetera or other electrical devices like entertainment appliances such as active speakers, Internet radios, DVD players, set-top boxes, TV sets, et cetera. The above described PoE system may be a PoE system in accordance with the IEEE standard 802.3af, i.e. 802.3at type 1, and/or in accordance with the IEEE standard 802.3at type 2. The Ethernet cables 13, 14 may be Cat5, Cat6 or Cat7 cables, wherein they may have preinstalled RJ 45 end connectors.

The power supply device 1 preferentially controls for each individual output port 12 the applied voltage and monitors for overcurrent. This may be based on a power requests signaled by the powered device controller 211 during the PoE negotiation process. Since the output voltage control may be distant to the powered devices, the current PoE standards specify a voltage range at the powered devices accounting for a voltage drop on cabling and interconnects. In known powered devices the relatively large PoE voltage range at the respective powered device imposes issues in the design of the driver of the respective powered device, and it limits the peak power per light point, if the powered device is a luminaire. For instance, the IEEE standard 802.3af standard defines a voltage range from 37.0 to 57.0 V at the respective powered device and the IEEE standard 802.3at type 2 defines a voltage range from 42.5 to 57.0 V at the respective powered device. The power supply device 1 is capable of generating the power for the powered devices plus the cable losses, wherein a powered device placed near to a power supply device with a relatively small cable length and low cable losses may take more power from the power supply device than a powered device at a distance of, for instance, 100 m.

The luminaire 2 described above with reference to FIG. 3 is adapted such that the available power can be fully exploited depending on the real cable losses. The luminaire 2 therefore beneficially counteracts the voltage range limitation. It may additionally reduce brown-out issues for the electrical load driver as maximum currents are controlled. In a brown-out situation, i.e., for instance, during power-up or when recovering from overload situations or when an overload situation is just entered such that the supplied voltage is getting below the specified voltage, known constant power loads, i.e. without the above described adaptation of the electrical load power to the measured voltage, would draw more current. This may drive the power distribution system into a critical load situation or, if a critical load situation is present already, even more into this critical load situation. If the brown-out situation occurs during power-up, the increased drawing of the current will slow down the power-up process. The luminaire described above with reference to FIG. 3 preferentially guaranties that the drawn current does not grow at lower input voltage and therefore helps in these brown-out situations.

In order to counteract the above mentioned voltage range limitation, the powered device preferentially has a power control circuit, i.e. the electrical load power controller 213 that has access to the voltage rails of the PoE supply, i.e. to the power path 251. These rails are available after the splitting of power and communication signals, which is preferentially performed by a magnetic circuit, and after the subsequent rectifier. The voltage is measured and dependent on the measured voltage level the lamp driver, i.e. the electrical load driver 212, gets the power control signal via the control signal path 254.

The powered device is preferentially adapted such that, whenever the input voltage is below the lower threshold voltage of, for instance, 40 V, the power level for the electrical load driver is set to a minimum output power of, for instance, 25 W. In a range between the lower threshold voltage and a maximum threshold voltage of, for instance, 57 V, the power gets preferentially linearly adapted to a maximum output power of, for instance, 34 W.

The lower and larger threshold voltages and/or the minimum and maximum output powers can also have different values. For instance, the lower threshold voltage may be 42.5 V, the minimum output power may be 25.5 W and the maximum output power may be 34.2 W, wherein, if these values are used, the maximum threshold voltage is preferentially 57.0 V. In an embodiment the powered device may be adapted such that below the lower threshold voltage the powered device shuts down, i.e. the dependence of the electrical load power on the measured voltage can start at the lower threshold voltage and run up to the maximum threshold voltage. It is also possible that below the lower threshold voltage the power level for the electrical load driver is set to a power level being smaller than the second constant value $P_{LT}$. This reduced power level can be an emergency power level which allows the powered device to provide emergency functions like providing an emergency light, if the powered device is a luminaire.

Since it can be assumed that the voltage drop in the respective Ethernet cable will not vary drastically on a relatively short term as long as the power level of the powered device is constant, the powered device is preferentially adapted such that a low pass filter for the control of the electrical load power is provided, in order to reduce reactions on noise and interferences, which may be present on the respective Ethernet cable. For instance, the voltage measurement unit 101 may be adapted to provide a measurement signal being indicative of the measured voltage, wherein the electrical load power providing unit 102 may be adapted to low pass filter the measurement signal. The measurement signal may be directly low pass filtered, or the measurement signal may be indirectly low pass filtered by low pass filtering a signal, which may have been derived from and/or which may depend on the measurement signal, like the above mentioned power control signal.

Although the linear dependence shown in FIG. 4 has a certain slope, in other embodiments the linear dependence can have another slope. Preferentially, if the powered device is a luminaire, the slope is equal to or smaller than a maximum slope, wherein the maximum slope is defined such that changes of the measured voltage, which may occur during normal operation conditions, do not lead to a light intensity change, which is observable by the human eye. The powered device is preferentially adapted such that the power level of the electrical load power, i.e. the power set point, is continuously adjusted, whenever the measured voltage changes.

Although in above described embodiments the linear dependence of the electrical load power on the measured voltage has a single slope only, in another embodiment the linear dependence can also have more than one slope. For instance, the dependence can be a bilinear dependence having two slopes. In particular, the electrical load providing unit can be adapted such that the power level of the electrical load power depends linearly on the measured voltage with a first slope within a first range of measured voltages and that the power level of the electrical load power depends linearly on the measured voltage with a second slope within a second range of measured voltages. In an embodiment the first slope may be used during power-up to a minimum power level of, for instance, 25 W, which may correspond to the above mentioned second constant value of the electrical load power, and the second slope may be used for further adjustments between the minimum power level and the maximum power level, which may be 34 W and which may correspond to the above mentioned first constant value of the electrical load power. Thus, the first range of measured voltages may be from zero to the above mentioned second threshold and the second range of measured voltages may be between the above mentioned first and second thresholds.

Although in the embodiment described above with reference to FIG. 3 the electrical load power controller 213 determines the power level of the electrical load power depending on the measured voltage, in other embodiments also other components of the powered device can provide this function. For instance, this power level control can be implemented in the powered device controller 211, which may already comprise analog circuitry and which may already use voltage thresholds for the identification and negotiation processes. For providing the power level setting function the respective component of the powered device can use a microcontroller or another kind of controller.

The electrical load power providing unit of the powered device can be used to seamlessly extend the PoE standard IEEE 802.3af and/or the PoE standard IEEE 802.3at, in order to boost the maximum power level of powered devices and in order to allow for a graceful degradation at the load side, whenever cable losses get high.

Although above certain configurations of the powered device have been described, in other embodiment the powered device can also be configured in another way such that the electrical load power level is adjusted dependent on the voltage of the PoE rails. Preferentially, the power level gets linearly reduced from maximum to minimum power in the voltage range from 57 V to 40 V. Moreover, the adjustment speed of the power level may be controlled, in order to reduce visible flicker effects. In particular, the power up slope may be controlled at least above the minimal power point. In an embodiment the slopes are different below the minimal power level and above the minimal power level. The power control function may be integrated with the powered device controller.

The powered device is preferentially adapted to allow for a feed-forward technique allowing for full use of available power without overloading the power supply device, i.e. a feedback loop is not necessarily required, because the control of the power level is performed by measuring the voltage at the powered device and setting the power level depending on the measured voltage.

Although in above described embodiments certain powered devices like luminaires, sensors, switching elements, et cetera have been described, in other embodiments the powered devices can also include other electrical devices like fans, user interfaces such as displays or switch panels, et cetera.

Although in the embodiment described above with reference to FIG. 3 the jack 20 and the power-data splitter 210 are separate components, in another embodiment the power-data splitter 210 may be integrated in the jack 20.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the power level of the electrical load power, the negotiation procedures, et cetera performed by one or several units or devices can be performed by any other number of units or devices. These procedures and/or the control of the powered device in accordance with the method for providing electrical load power to an electrical load of the powered device within the power distribution system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a powered device like a luminaire for being used in a power distribution system, which is preferentially a PoE system and which comprises a power supply device. The powered device includes an electrical load like a light source, a voltage measurement unit for measuring a voltage received by the powered device, and an electrical load power providing unit for transforming power supplied by the power supply device to an electrical load power to be provided to the electrical load, wherein the power level of the electrical load power depends on the measured voltage. This allows adapting the power intake to the really received voltage, which may be reduced due to losses like cable losses, which in turn can lead to an increased intake power in comparison to the intake power of powered devices in accordance with the actual PoE IEEE 802.3at standard.

The invention claimed is:

1. A powered device for being used in a power distribution system, the system comprising a power supply device for supplying power to the powered device and an electrical conductor connected to the power supply device and the powered device for transmitting the power and data between the power supply device and the powered device, wherein the powered device comprises:
   an electrical load,
   a voltage measurement unit for measuring a voltage received by the powered device, and
   an electrical load power providing unit for transforming the supplied power into an electrical load power and for providing the electrical load power to the electrical load, wherein the electrical load power providing unit is adapted such that the power level of the electrical load power depends on the measured voltage, wherein the electrical load power providing unit is adapted such that the power level of the electrical load power depends linearly on the measured voltage.

2. The powered device as defined in claim 1, wherein the electrical load power providing unit is adapted such that the power level of the electrical load power depends linearly on the measured voltage, if the measured voltage is smaller than a first threshold and larger than a second threshold.

3. The powered device as defined in claim 2, wherein the electrical load power providing unit is adapted such that, if the measured voltage is larger than a first threshold, the power level has a first constant value.

4. The powered device as defined in claim 1, wherein the electrical load power providing unit is adapted such that the power level of the electrical load power depends linearly on the measured voltage with a first slope within a first range of measured voltages and that the power level of the electrical load power depends linearly on the measured voltage with a second slope within a second range of measured voltages.

5. The powered device as defined in claim 1, wherein the voltage measurement unit is adapted to provide a measurement signal being indicative of the measured voltage, wherein the electrical load power providing unit is adapted to low-pass filter the measurement signal.

6. The powered device as defined in claim 1, wherein the powered device comprises a power-data splitter for splitting the data and the power transmitted by the electrical conductor and wherein the voltage measurement unit is adapted to measure the voltage behind the power-data splitter.

7. The powered device as defined in claim 6, wherein the powered device further comprises a rectifier for rectifying the split power and wherein the voltage measurement unit is adapted to measure the voltage behind the rectifier.

8. The powered device as defined in claim 1, wherein the electrical load power providing unit comprises:
an electrical load driver for transforming the supplied power into the electrical load power and for providing the electrical load power to the electrical load, and
an electrical load power controller for determining the power level of the electrical load power depending on the measured voltage and for sending a power control signal being indicative of the determined power level to the electrical load driver, wherein the electrical load driver is adapted to transform the supplied power into the electrical load power in accordance with the power control signal.

9. The powered device as defined in claim 1, wherein the powered device is a Power-over-Ethernet device.

10. The powered device as defined in claim 1, wherein the electrical conductor is an Ethernet cable.

11. A power distribution system comprising:
a power supply device for supplying power,
a powered device for receiving the supplied power as defined in claim 1, and
an electrical conductor connected to the power supply device and the powered device for transmitting the power and data between the power supply device and the powered device.

12. The system as defined in claim 11, wherein the system is a Power-over-Ethernet system.

13. A method for providing electrical load power to an electrical load of a powered device as defined in claim 1, wherein the method comprises:
measuring a voltage received by the powered device by a voltage measurement unit of the powered device, and
transforming the supplied power into an electrical load power and providing the electrical load power to the electrical load by an electrical load power providing unit, wherein the power level of the electrical load power depends on the measured voltage.

14. A non-transitory computer readable medium comprising a computer program for providing electrical load power to an electrical load of a powered device, the computer program comprising program code means for causing the powered device to carry out the steps comprising:
measuring a voltage received by the powered device by a voltage measurement unit of the powered device, and
transforming the supplied power into an electrical load power and providing the electrical load power to the electrical load by an electrical load power providing unit, wherein the power level of the electric load power depends on the measured voltage,
wherein the electric load provided unit is adapted such that the power level of the electric load power depends linearly on the measured voltage.

15. The method of claim 13, wherein the power level of the electrical load power depends linearly on the measured voltage, if the measured voltage is smaller than a first threshold and larger than a second threshold.

\* \* \* \* \*